Oct. 20, 1925.
A. C. FOULK
1,557,822
PRESSURE REGULATOR, SYLPHON TYPE
Filed Dec. 3, 1920   2 Sheets-Sheet 2
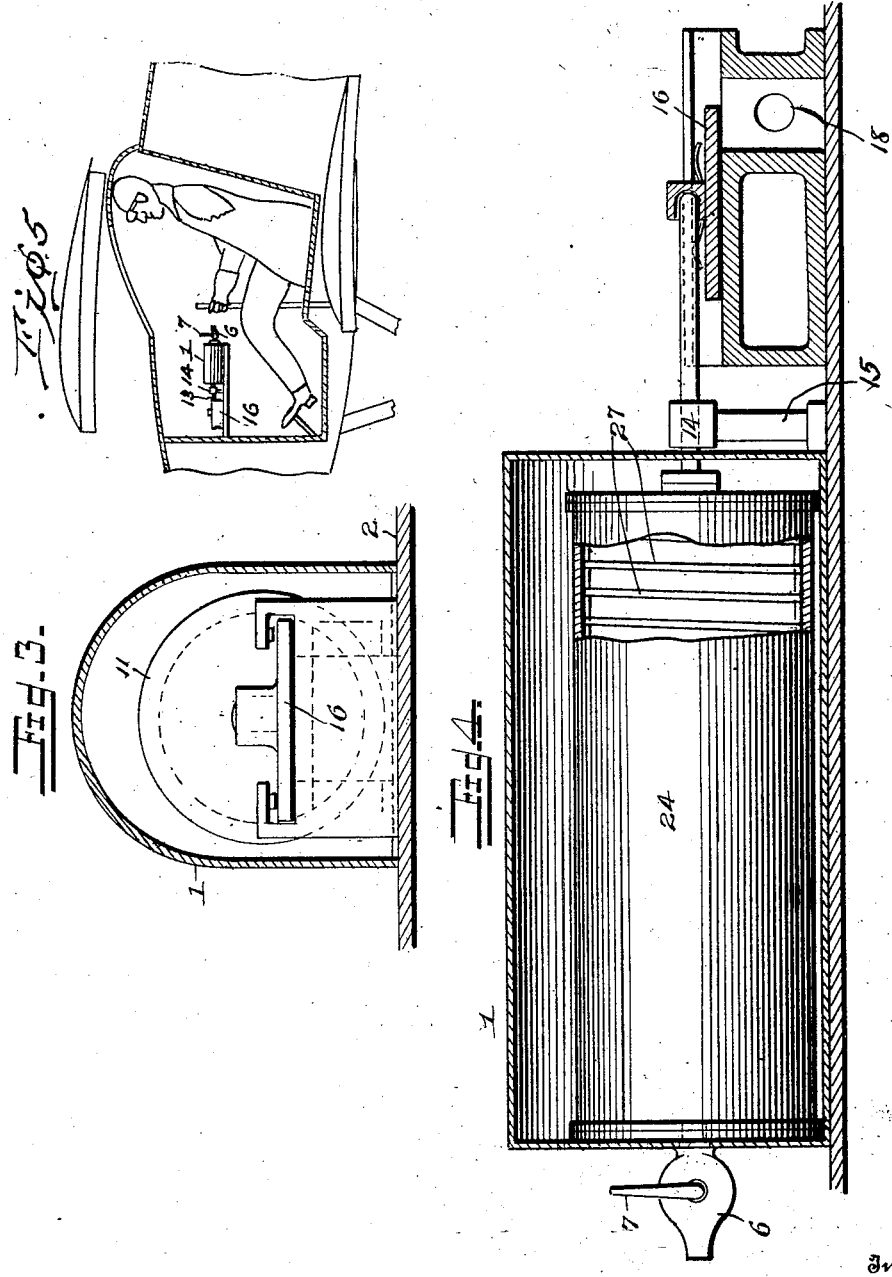

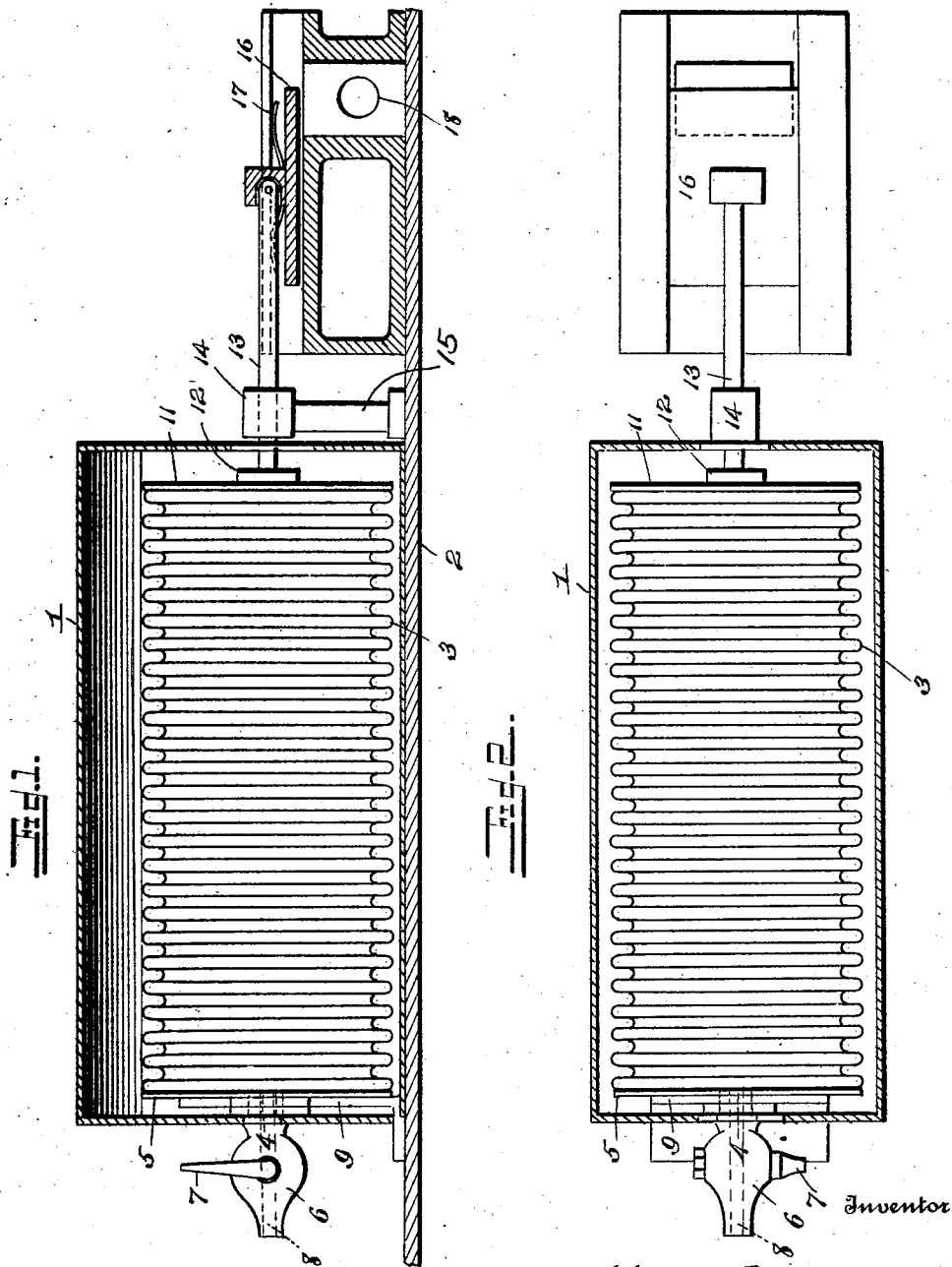

Patented Oct. 20, 1925.

1,557,822

UNITED STATES PATENT OFFICE.

ALBERT C. FOULK, OF DAYTON, OHIO.

PRESSURE REGULATOR, SYLPHON TYPE.

Application filed December 3, 1920. Serial No. 428,163.

*To all whom it may concern:*

Be it known that I, ALBERT C. FOULK, citizen of the United States, residing at Dayton, in the county of Montgomery and State of Ohio, have invented certain new and useful Improvements in Pressure Regulators, Sylphon Type, of which the following is a specification.

This invention relates in general to pressure regulators, and more particularly to constant pressure regulators for governing the passage of fluid thru a supply pipe.

It is the object of my invention to provide a pressure regulator in which the agent is the volumetric change of an enclosed volume of gas due to a variation in a surrounding pressure.

The particular embodiment of my invention, as shown, was developed with a view to use in aeronautics and was designed in this connection to regulate the flow of air necessary to maintain a given pre-determined pressure in an air-tight compartment such as has been proposed for use in aviation in extremely high altitudes. In view of the discomfort due to pressure variations involved in great changes in altitude, the utility of my device would be apparent. It would be understood, however, that my invention is in no sense limited to the above mentioned use, but is capable of functioning as a pressure regulator for any supply pipe system wherein the rate of flow of a fluid, the degree of pressure to be maintained in any apparatus, or any similar function, is to be governed by the volumetric variation on an enclosed body of gas at a pre-determined pressure.

A complete description of my invention will be found in the accompanying specification and drawings and embodied in the claims appended thereto.

Fig. I is a side elevation, partly in section, of my invention as adapted to control the passage of fluid thru a supply pipe;

Fig. II is a plan view of the same;

Fig. III is an end view of Fig. I;

Fig. IV is an elevation similar to Fig. I, showing a modification of my invention.

Figure V is a side elevation of an airplane with portions broken away to show the installation of my device.

My constant pressure regulator embodies a container 1 which is composed, preferably, of heat insulating material fastened in any approved manner to the wall 2 of the air-tight chamber or passenger car the pressure in which is to be regulated. In the preferred embodiment of my invention, as shown in Figures I, II, and III, there is provided a sylphon, an air-tight container 3 of comparatively thin sheet metal of great resiliency constructed with deep corrugations such as to permit it to expand or contract after the manner of a bellows with the minimum resistance due to elastic strain of the metal of which it is composed. This sylphon is fluid-tight except at 4, where an opening is provided to adapt the sylphon to the pre-determined pressure to be maintained. The sylphon is re-enforced by an end-plate 5 brazed or soldered thereto. The plate 5 is fixably connected to the bracket 9, which in turn is connected by any approved means to the wall 2 of the chamber. The end-plate 5 at this point 4 is provided with internal screw threads for the reception of valve housing of the air-cock 6. This valve housing contains the manually operated valve 7, controlling the passage of the expansive fluid thru the passage 8 between the cock inlet and the interior of the sylphon.

The free end of the sylphon is provided with plates 11 and 12 for the reception of a valve rod 13 which passes thru the bearing or guide 14. The guide 14 is maintained in position by support or bracket 15. The valve rod 13, as shown, operates a sliding valve 16 which is seated by the valve spring 17. This sliding rod, as shown, regulates the passage of fluid thru the fluid port 18.

*Operation.*

From the foregoing, the operation of my device will be seen to be as follows:

As stated, this adaptation of my invention was developed for the purpose of maintaining a pre-determined air pressure in the air-tight chamber above referred to. If it is desired that this pressure be the same as that at the ground, it is merely necessary to open the cock 6 by means of the valve 7 and the pressure in the interior of the sylphon will equalize with that of the air at the ground. If it is desired to create a pressure equivalent to that of any given altitude, such as, say,—five or ten thousand feet, that may be accomplished thru the air-cock 8 by the use of the usual well known pressure reducing means.

In the type of passenger container for which this invention is adapted, it is desired to maintain a constant pressure at all altitudes. The air, to be fed into this passenger container by any approved means, may be regulated by invention as described; and the outlet for the purpose of ventilation or for the purpose of prevention of excess pressure can also be regulated thereby.

The valve is normally set to permit the inlet or escape of a sufficient amount of the air in the said passenger container to provide the necessary ventilation at the given predetermined sylphon control pressure. In the event that the pressure within the passenger containing chamber falls below the predetermined sylphon setting, the valve will expand, closing the air outlet port in the case of the outlet control, and opening the pressure inlet port in case it is adapted to control the pressure inlet.

As before stated, the container 1 is composed of a heat insulating material to prevent in so far as possible any variation of the volume of gas in the sylphon due to temperature changes. Emphasis is again given to the fact that the sylphon is so constructed as to minimize to the greatest possible extent, the placing of any elastic strain on the metal of the sylphon which is to be operated by the pressure of gas expansion alone.

In the embodiment shown in Fig. IV, the general construction of the casing and operating means are identical with the exception that a cylinder 24 and a piston 25 are substituted for the sylphon. Piston 25 is provided with rings 27 to prevent fluid leakage. As will be seen, the operation will be exactly similar to that of the sylphon type in that the expansion or contraction of the gas or fluid admitted to the space 20 will cause a motion of the valve exactly as in the case of the expansion and contraction of the sylphon.

I claim—

1. In combination, in a pressure regulator, means containing an expansive fluid under constant predetermined pressure, and a valve means operable thereby, and a heat insulating container for said operating means.

2. In combination, in a pressure regulator, a sylphon containing an expansive fluid at a constant predetermined pressure, and a valve means operable thereby, and a heat insulating container for said operating means.

3. In combination, in a pressure regulator, means containing an expansive fluid under constant predetermined pressure, and a valve means operable thereby, valve means for establishing said constant predetermined pressure.

4. In combination, in a pressure regulator, means containing an expansive fluid under constant predetermined pressure, and a valve means operable thereby, and a heat insulating container for said operating means, and means for establishing said constant predetermined pressure.

5. In combination, in a pressure regulator, a sylphon containing an expansive fluid at a constant predetermined pressure, and a valve means operable thereby, freely operable valve means for establishing said constant predetermined pressure.

6. In combination, in a pressure regulator, a sylphon containing an expansive fluid at a constant predetermined pressure, and a valve means operable thereby, and a heat insulating container for said operating means, and means for establishing said constant predetermined pressure.

7. In combination, in a pressure regulator, a pressure responsive element comprising a fluid container of comparatively thin metal of great resiliency, and a pressure responsive expansive fluid at a predetermined constant pressure contained therein, freely operable valve means for establishing said predetermined constant pressure.

8. In combination, in a pressure regulator, a pressure responsive element comprising a fluid container of comparatively thin metal of great resiliency, and a pressure responsive expansive fluid at a predetermined constant pressure contained therein, and the heat insulating container for said operating means.

9. In combination, in a pressure regulator, a pressure responsive element comprising a fluid container of comparatively thin metal of great resiliency, and a pressure responsive expansive fluid at a predetermined constant pressure contained therein, the valve means operable thereby, freely operable valve means for establishing said predetermined constant pressure.

10. In combination, in a pressure regulator, a pressure responsive element comprising a fluid container of comparativly thin metal of great resiliency, and a pressure responsive expansive fluid at a predetermined constant pressure contained therein, valve means for establishing said constant predetermined pressure.

11. In combination in a pressure regulator, a sylphon containing an expansive fluid at a constant predetermined pressure, a valve means operable thereby, a heat insulating container for said operating means, and freely operable valve means extending through said heat insulating container for connecting said sylphon with a source of pressure of predetermined magnitude.

In testimony whereof I have affixed my signature.

ALBERT C. FOULK.